Patented Jan. 14, 1947

2,414,399

UNITED STATES PATENT OFFICE 2,414,399

STABILIZER AND PLASTICIZER FOR VINYL RESINS

Earl H. Sorg, Hyde, Md., assignor to The Glenn L. Martin Company, Middle River, Md., a corporation of Maryland No Drawing. Application July 26, 1943, Serial No. 496,153

3 Claims. (Cl. 260—36)

This invention relates to synthetic resins and is particularly concerned with compositions and articles which are composed of resins of the vinyl halide type and which are highly resistant to decomposition of the resin under high temperatures.

It is well known that resins of the vinyl halide type may be given rubber-like properties when plasticized with certain plasticizers but that such compositions tend to discolor and to lose some of their rubber-like properties when subjected to high temperatures. For example, when vinyl chloride resins are plasticized with dibutyl phthalate and subjected to temperatures of 90° C. to 100° C. they change in color from an initially clear or light straw color to a dark amber or reddish brown color and may lose large percentages of their tensile, elongation and dielectric values while their permanent set values may increase considerably. This discoloration is the result of a decomposition of the resin with the production of hydrogen chloride and the consequent creation of an acid condition. For these reasons, such compositions are not suited to the making of articles which are subjected to high temperatures during their manufacture or use or which are to come into contact with the human skin.

Various substances including metallic salts and organic and inorganic compounds have been added to inhibit such decomposition but, although effective as stabilizers to varying degrees, they tend to reduce the tensile and dielectric strengths and, when not compatible with the resin, to cause clouding of the composition.

I have discovered that diisobutyl adipate is not only an excellent plasticizer for vinyl halide resins but also that it possesses the unexpected property of stabilizing such resins, that is, of preventing their decomposition and discoloration and change of physical properties, even under prolonged subjection to high temperatures. I have further discovered that diisobutyl adipate is compatible with dibutyl phthalate and other vinyl resin plasticizers and can be used alone or in varying proportions with such plasticizers to produce articles with varying stabilities depending upon the amount of the adipate present, including rubber-like molded or dipped articles.

Since no other decomposition inhibitor need be used with it, the tensile, dielectric and elongation values of the vinyl halide resins are not impaired thereby and cloudiness in transparent goods, traceable to such inhibitors, is avoided.

Example I

Two compositions were made, each containing 13.5% by weight of a mixture of 20% of a copolymer of vinyl chloride and vinyl acetate containing between 93% and 96% of the chloride and 80% of a copolymer of the same substances containing between 85% and 90% of the chloride. One composition contained 86.5% of dibutyl phthalate and the other contained 86.5% diisobutyl adipate. It will be noted that neither of these compositions contained any solvent and that each contained a quantity of plasticizer considerably in excess of that required to plasticize the amount of resin present to make articles having rubber-like properties.

These two compositions were subjected to a constant temperature of between 90° C. to 95° C. After 54 days the composition containing the adipate had changed color only slightly. At the end of the first day the color of the composition containing the phthalate had changed to an amber color and at the end of a week it had become brownish in color and quite acidic. At that time it was no longer suitable, because of its color, for use in articles whose color should not change, was not suitable for articles which were to come in contact with the human skin, was not suitable for material requiring high dielectric strength, for example, cable insulation, and was not suitable for articles whose rubber-like properties were to be maintained quite close to those of the composition before heating began.

Example II

A composition was made consisting of 12.3% of the copolymer of vinyl chloride-vinyl acetate containing about 93% to 96% of the chloride, 13% of dibutyl phthalate, 65% of cyclohexanone, 9.1% acetone and .6% castor oil. Another composition was made like the foregoing composition except that the phthalate was replaced by 13% of diisobutyl adipate. The castor oil was used for its toughening properties and had no effect on the test.

These two gel compositions were subjected to a constant temperature of 90° C. to 95° C. The composition containing the phthalate showed a distinct color change at the end of two days and had a dark red or amber color at the end of four days' time. In six or seven days its color was a dark reddish brown. At the end of the fourth day it was no longer suitable for articles where preservation of the original color was important or where they would come into contact with the human skin, or where high dielectric strength is required, or where preservation of the original rubber-like properties was important. The composition containing the adipate showed no color change during the first two days and at the end of the fourth day it had changed to a medium amber color. In six to seven days its color had become a dark amber but it was still satisfactory for articles which were to come into contact with the human skin and it still retained its original physical properties to a satisfactory extent.

Furthermore I have discovered that diisobutyl adipate has an unexpected effect on the physical properties of vinyl halide resins under low temperature conditions. Thin dipped articles made from the two compositions of Example II with walls about .012" thick were subjected to temperatures ranging from 25° C. to —40° C. The articles containing the adipate were still rubber-like at 0° C. and were still flexible at —40° C. while the articles containing the phthalate were dead, that is, had no rubber-like properties at 0° C. and rigid at —40° C.

*Example III*

Two molding compounds were made, each containing 53% of vinyl chloride-vinyl acetate copolymer containing 93% to 96% of vinyl chloride, and 2% of castor oil. One compound contained 45% of dibutyl phthalate and the other contained 45% of diisobutyl adipate. Small articles were molded from each of these compositions. The molding time was 15 minutes and the temperature was 145° C. to 147° C. The molded articles containing the dibutyl phthalate were dark amber in color and also displayed other evidences of decomposition of the resin. The molded articles containing the diisobutyl adipate were light yellow in color and displayed substantially no evidence of resin decomposition.

Tests with other adipate plasticizers, for example, cyclohexyl adipate, dibutyl adipate and ethoxyethyl adipate have shown no marked ability as decomposition inhibitors which serves to demonstrate the novelty and utility of using diisobutyl adipate as a combination plasticizer and stabilizing agent.

The term "rubber-like" as used herein means that the articles can be stretched to more than 100% of their original dimensions, and when released, will snap back forceably to substantially their original dimensions.

It will be understood that any of the fillers, coloring agents, tougheners and the like which are added to vinyl halide resin compositions may be used with compositions embodying the present invention.

When the articles embodying this invention are to be sealed against loss of plasticizer, the composition may contain a sealant of the type disclosed in copending application Serial No. 496,151, filed July 26, 1943, that is, a chlorinated hydrocarbon selected from the group consisting of aliphatic hydrocarbons containing from about 20% to about 68% of chlorine and having more than 15 carbon atoms per molecule; and aromatic hydrocarbons containing from about 26% to about 63% of chlorine and having, per molecule, two or more benzene rings each united to another by two common carbon atoms.

When the articles of this invention are to be rubber-like and formed by dipping, the composition may include the low vapor pressure solvent and the high vapor pressure diluent described and claimed in copending application Ser. No. 496,152, filed July 26, 1943, that is, cyclohexanone, isophrone, acetonyl acetone and the like as a solvent; and acetone, butyl acetate, dioxane and the like as a diluent. At a temperature of 50° C. the above-mentioned solvents have low vapor pressures, that is, pressures of 20, 1.6, and 3.3 mm. of mercury respectively; and at the same temperature the said diluents have high vapor pressures, that is, pressures of 610, 47, and 125 mm. of mercury respectively.

Having thus described the present invention so that others skilled in the art may practice the same, I state that what I desire to obtain by Letters Patent is set out in what is claimed.

What is claimed is:

1. A composition comprising a polyvinyl halide resin containing more than about 85% polyvinyl halide, and a combination stabilizer and plasticizer therefor including diisobutyl adipate.

2. A composition comprising about 53% vinyl chloride-vinyl acetate polymer resin containing between about 93% and about 96% vinyl chloride, and comprising about 2% castor oil, and about 45% diisobutyl adipate.

3. A dipping composition comprising a polyvinyl halide resin containing more than about 85% polyvinyl halide, a combination stabilizer and plasticizer therefor including diisobutyl adipate, a solvent, and a diluent having vapor pressure greater than the vapor pressure of said solvent.

EARL H. SORG.